United States Patent [19]

Rabito

[11] Patent Number: 4,718,079
[45] Date of Patent: Jan. 5, 1988

[54] REMOTE UNIT MONITORING SYSTEM

[76] Inventor: Giuseppe Rabito, 1350 Admiral La., Uniondale, N.Y. 11553

[21] Appl. No.: 880,282

[22] Filed: Jun. 30, 1986

[51] Int. Cl.⁴ ...................... H04M 3/24; H04M 11/04
[52] U.S. Cl. ........................................ 379/2; 379/106; 379/39
[58] Field of Search ................. 379/106, 2, 39, 1; 340/635, 658, 660, 664, 638, 531, 539

[56] References Cited

U.S. PATENT DOCUMENTS 3,800,207  3/1974  Kott .................................. 340/635
4,056,684  11/1977  Lindstrom ........................ 379/106

Primary Examiner—Stafford D. Schreyer
Attorney, Agent, or Firm—Michael I. Kroll

[57] ABSTRACT

A remote unit monitoring system is provided which monitors any number of hazard conditions in an electrical substation and transmits this information via telephone lines and radio link to a central station. The system automatically dials the central station, after checking the integrity of each communications channel. Data is transferred only after a kissoff signal is received from the central station indicating that the communication channel is secure. The substation continues transmitting the data until the data accuracy is verified by the central station. Battery backup of all critical circuits is provided as well as visual indications of any failure in the system. The central station is provided with the ability to query the substation at any time.

11 Claims, 4 Drawing Figures (8 CHANNEL DIGITAL COMMUNICATOR)

(SUB-STATION)

(CENTRAL STATION WHERE ALL INFORMATION IS RECIEVED, STORED AND ACTED UPON)

| B | BLACK |
|---|---|
| C | CHANNEL |
| G | GREEN |
| O | ORANGE |
| R | RED |
| Ⓖ | GREEN LED |
| Ⓡ | RED LED |

REMOTE UNIT MONITORING SYSTEM

BACKGROUND OF THE INVENTION

The instant invention relates generally to the field of monitoring equipment, and, more specifically, to high integrity monitoring of electrical generation and transmission systems.

Electrical substation must now monitor up-to-the-minute status of all high voltage feeder circuit breakers including air, and oil types and phase isolated and ganged types. They must also monitor low and high temperature alarms, low or high liquid level alarms, low or high gas or air alarms, as well as fire alarms, unauthorized entry alarms, station light and power alarms.

Present alarm systems are complex and expensive to construct and operate and do not provide the fail-safe operation so vital to the power industry. They are not easily remotely interrogated and do not report on the status of monitored systems.

SUMMARY OF THE INVENTION

It is, therefore, a primary object of the present invention to provide a remote unit monitoring system designed to monitor and transmit data from a substation to a central station which is normally located at the nerve center of the company.

A further object is to provide a remote unit monitoring system which monitors the up-to-the-minute status of all high voltage feeder circuit breakers of any type including air and oil types, phase isolated or gang operated. The system will also monitor low or high temperature alarms, low or high liquid level alarms, low or high gas or air alarms, as well as firs alarms, unauthorized entry alarms, and station light and power alarms.

A further object is to provide a remote unit monitoring system which when a failure occurs automatically tests the available phone lines for short circuits, open circuits, or other faults, and selects the operative one and dials the central station.

A still further object is to provide a remote unit monitoring system which re-transmits the failure data until the central station acknowledges the reception of identical messages and transmits a kissoff message back to the substation.

A yet further object is to provide a remote unit monitoring system which has its own built-in back up power source.

A yet still further object is to provide a remote unit monitoring system which allows the substation operator to isolate monitored subsystems so that they may be adjusted or repaired without giving fault indications, while at the same time giving indications at both the substation and at the central station that the subsystem has been isolated.

A yet still further object is to provide a remote unit monitoring system which allows the status of all substation subsystems to be reported locally be depressing a momentary switch.

A yet still further object is to provide a remote unit monitoring system which allows the status of all substation subsystems to be reported remotely at the central station by transmitting a series of tones over a phone line.

Further objects of the invention will appear as the description proceeds.

To the accomplishment of the above and related objects, this invention may be embodied in the form illustrated in the accompanying drawings, attention being called to the fact, however, that the drawings are illustrative only and that changes may be made in the specific construction illustrated and described wtihin the scope of the appended claims.

BRIEF DESCRIPTION OF THE DRAWING FIGURES

The figures in the drawings are briefly describd as follows.

DETAILED DESCRIPTION OF THE PREFERRED EMBODIMENTS

POWER SUPPLY.

Figure 1:
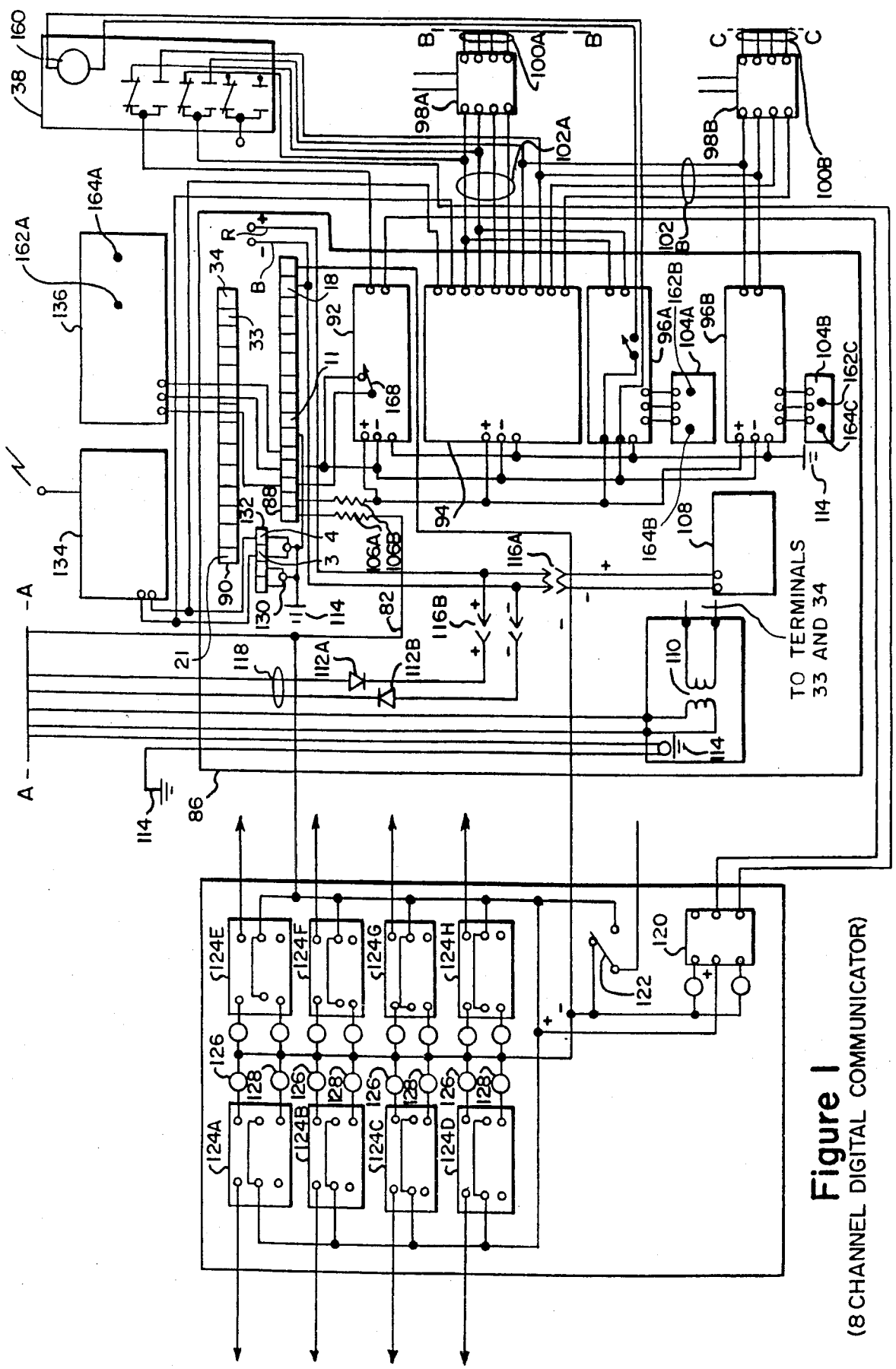
FIG. 1 is a partial electrical block diagram of the substation components of the invention.
Figure 2:
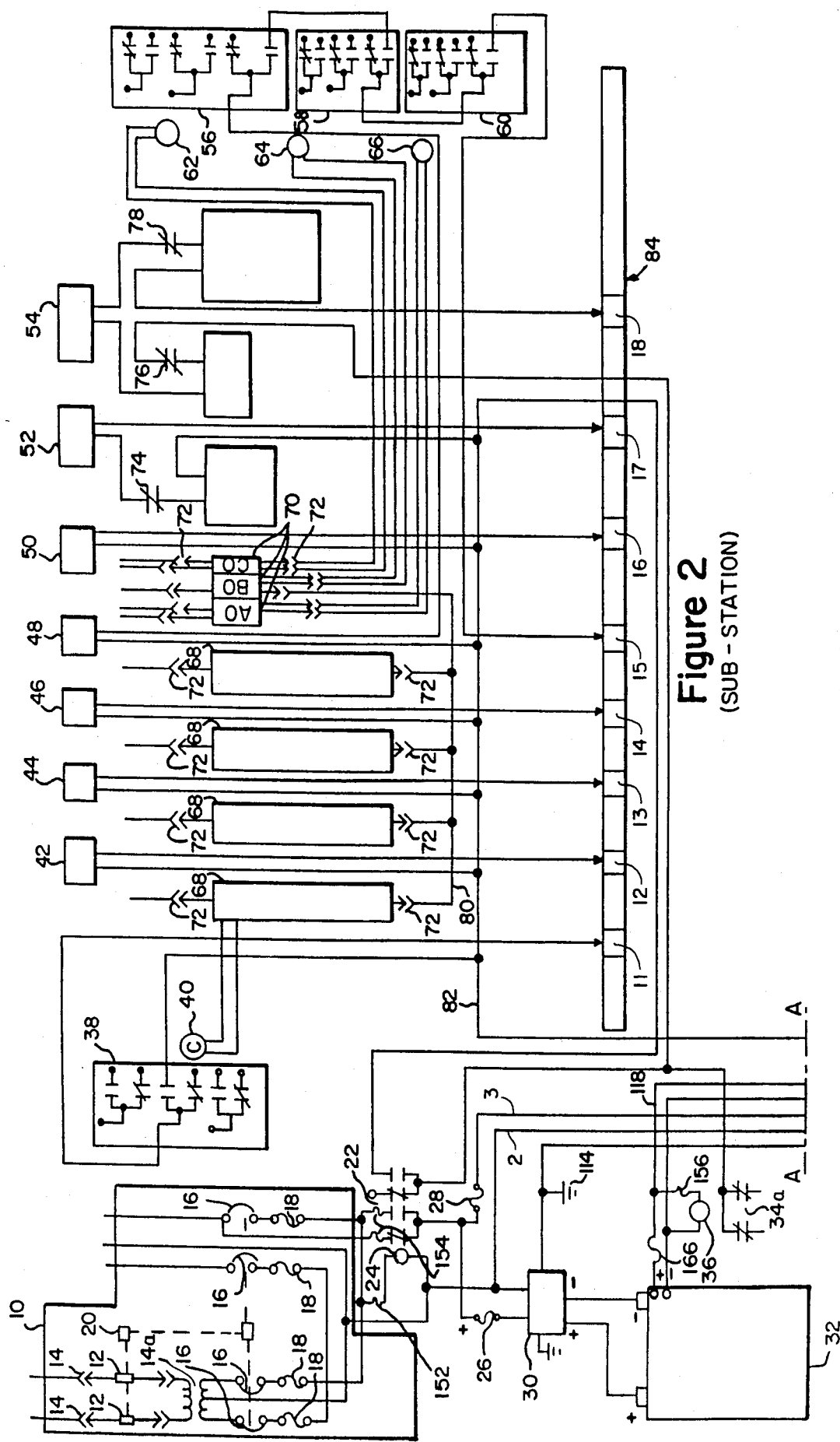
FIG. 2 is a partial electrical block diagram of the remainder of the substation components of the invention.

The operation of the power supply for the substation components is best understood with reference to FIG. 2. The conventional power source 10, found in a typical ac substation, has is used to supply ac electric power to all station lighting, outlets and wherever a single 3 phase source is required. Two ac mains inputs are provided. At connector 14 4 kV tapped off a transformer secondary is stepped down to 120 vac by transformer 14a. Alernatively, 120 vac from street service is available. A mechanical interlock 20 which controls contacts 16 and 2,300 volt fuses 12 assures that only one power source is operative. In FIG. 1 mechanical interlock 20 is shown in its "normal" position with the 4 kV input 14 operative. In the "emergency" position the street service input is energized. All low voltage circuits are protected by fuses 18.

The 120 vac source is used to energize solenoid 24 thereby switching relay contacts 22 which conduct 120 vac to 48 volt dc battery charger 30. Solenoid 24 is protected by fuse 24; contacts 22 are protected by fuses 154 and battery charger 30 is protected by fuse 26. 120 vac is also output to leads labelled 2 and 3 which continue in FIG. 2 to transformer 110 via fuse 28. Transformer 110 steps the voltage down to 13.5 vac which is input to the 8 channel digital communicator via terminals 33 and 34 on terminal strip 90. An output of digital communicator labelled "B" and "R" provides 6 volts dc to charge rechargeable battery 108 via connectors 116A. In normal operation, the 48; volt battery source 32 is tapped off at the 6 volt level at 118 via fuse 166 and is connected through isolation diodes 112A and 112B via connectors 116B to supply power with diodes 112A and 112 conducting. In an emergency, when the output of 48 volt battery 32 falls below the required level, diodes 112A and 112B stop conducting and rechargeable battery 108 handles the load. Meanwhile, if an under or over voltage condition occurs at the 6 v tap 118 on battery 32 then solenoid 36 energizes contacts 34 which transmit an over/under voltage fault condition to the digital communicator.

GENERATION OF FAULT SIGNALS.

In FIG. 2, 8 fault channels are shown, although any number of channels could be used. Channel #1 monitors the transformer secondary air or oil circuit breaker 68, connected at terminals 72. Breaker 68 inputs the 4 kV power into the system to be distributed along 4 kV bus 80. The solenoid 40 of relay 38, when activated by a fault in breaker 68 outputs a fault signal to Channel #1 at pin 11 of lower board 84. In an analogous manner, feeder air or oil breakers 68 when faulted activate their respective relays 42, 44 and 46 to output fault signals to Channels #2, 3 and 4 at pins 12, 13 and 14 respectively of board 84. For phase isolated air or oil circuit breaker 70, since each phase is switched, each phase must be monitored. The output of "A0" phase activates solenoid 66, "B0" activates solenoid 64, and "C0" phase activates solenoid 62. The switch contacts of these relays, 60, 58 and 56 are connected in series with relay 48 to provide output to channel 5 at pin 15 of lower board 84. All station security contacts, typified by contact 74, activate relay 52 when faulted to output a fault signal to channel 7, pin 17 of lower board 84. In a similar manner smoke or heat detectors and all liquid temperature or oil level indications or loss of normal air supply are occasioned by the fault closure of contacts typified by 76 and 78 which cause relay 54 to output a fault signal to Channel 8 at pin 18 of lower board 84.

ISOLATION OF SELECTED CHANNELS.

It is sometimes desirable to isolate a channel from the monitoring system to, for example, perform maintenance on a circuit. In FIG. 1 the double-pole-double-throw switches labelled 124A to 124E serve this function by opening the failure signal leads for channels 1 to 8 respectively. Using switch 124A as an example, when the switch toggle is up, green lamp 126, typically a light emitting diode, or LED, glows indicating the channel is operative. When the toggle is down, red LED 128 glows indicating that the channel has been bypassed.

AUTOMATIC OPERATION IN FAILURE MODE.

A failure signal at pins 11 to 18 of lower board 88 or the test channel of upper board 90, signals the 8 channel digital communicator at pins 3 and 4 of terminal strip to signal the telephone select a line 94 to look for a good telephone line. Telephone line fault monitor #1, numeral 96A tests the line for opens, shorts, or other faults. If none are found then the telephone connections to the digital communicator are switched to the telephone line #1, numeral 100A, through its interface 98A. If there is a fault on line #1 then LED 164B on 104A turns on and may only later be reset using pushbutton 162B. Meanwhile telephone select a line 94 then instructs telephone line fault monitor 96B to test line #2 for faults. If none are found then the telephone connections to the digital communicator are switched to the telephone line #2, numeral 100B, through its interface 98B. If there is a fault on line #2 then LED 164C on 104B turns on and may only later be reset using pushbutton 162C. Although both phone lines may be inoperative the fault signals may still be sent via long range radio RF 900 MHz transmitter 134.

There are a number of ways in which the 8 channel digital communicator may be configured to deal with multiple phone lines and the radio link. In one typical configuration after a normal 150 millisecond response time, or programmed 16 second delay, the communicator executes a line seizure and forces a 1.6 second hangup. All phones that are connected to the telephone line will be disconnected while the communicator is in service. The communicator then checks for a dial tone. If a dial tone is detected, then the communicator dials, using touch tone or rotary dial format, up to 16 digit telephone numbers. It may be programmed to do this in three ways. First, it calls the second number upon failing to receive a kissoff, after two attempts on the first number. Then it alternates every two calls between the first and second number. Second, it may always call the second number even after kissoff or eight attempts with the first number. Third, it may have only selected channels report on each number.

If a dail tone is not detected within eleven seconds, the digital communicator will dial anyway as it assumes that a good connection has been made and that dial tone may not be operative.

Successful connections are verified when the communicator receives an acknowledgment tone from the central station receiver. If this tone is not received within 30 seconds the communicator will disconnect from the line and wait 30 seconds before trying again. This will be repeated up to eight times, or, if programmed, for unlimited attempts. But, if a connection is not made after eight atempts, then the communicator gives up and its red kissoff fail LED will light.

Transmission will begin when the acknowledgement tone is received. The communicator will transmit in low or high speed format depending upon which acknowledgment tone has been received from the central station.

To ensure proper transmission, the communicator sends each message up to four times. As soon as the central station receiver detects two successive identical messages it considers the transmission valid and sends a kissoff message to the communicator which causes the communicator to shut down and await the next operation. If the communicator does not receive the kissoff code, it will disconnect and will dial again. It will make eight attempts, or unlimited attempts if so programmed, to reach the central station via the primary or secondary phone line or the 900 MHz RF radio. The communicator will make eight attempts to contact each number.

COMMUNICATOR FAILURE LIGHTS.

The 8 channel digital communicator has three failure lights, for battery failure, pwoer failure and for kissoff failure. Once lit, the only way these can be reset is by momentarily depressing single pole single throw switch 122, which applies a reset signal to pin 21 on commuincator upper board 90.

REMOTE COMMAND OF MONITOR.

Line #1, numeral 100A is considered the primary phone line. Relay 38 connects this phone line to remote command responder 168 which signals the 8 channel digital communicator to transmit the status of all channels. If telepone line fault monitor #1 detects a fault on line #1, then it energizes solenoid 160 to cause the contacts on relay 38 to switch the connections to telephone line #2, numeral 100B. The tone responder 92 may be taken off-line using double pole double throw slide switch 120. If the responder 92 is on-line then the green light attached to switch 120 lights, and, conversely, if the responder is taken off-line then the red light attached to switch 120 will light. In any case, the telephone input to the 8 channel communicator is protected from phone line surges by surge protector 130.

LOCAL SYSTEM TESTING.

The digital communicator can be tested at the substation by depressing push button momentary digital communicator test switch 136. If the system is faulted red light 162A will glow which can only be reset using reset button 164A.

CENTRAL STATION COMPONENTS.

Figures 3, 4:
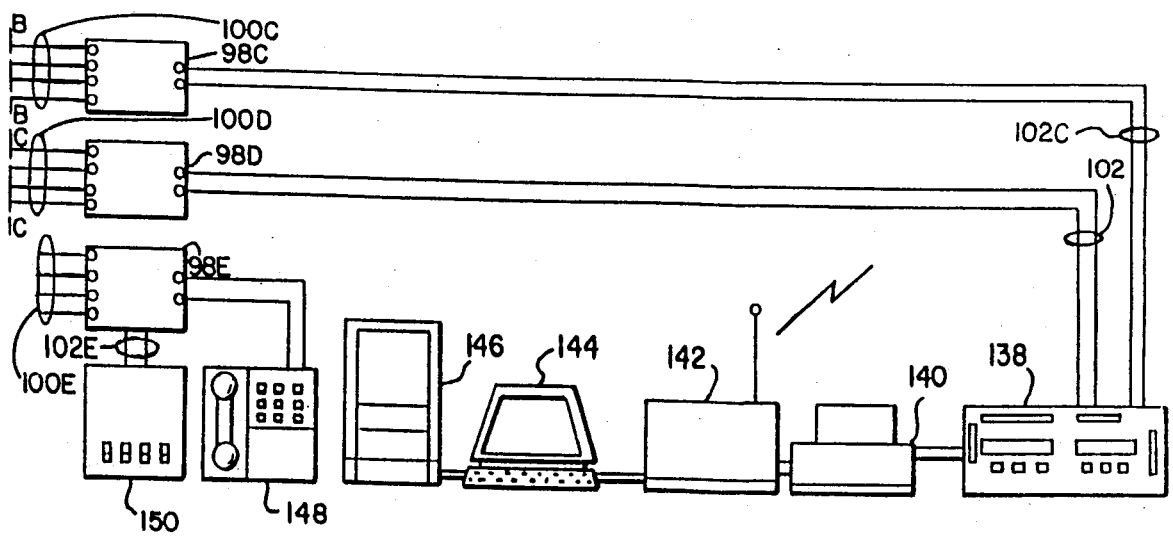
FIG. 3 is a diagrammatic view of the central station subsystems.
FIG. 4 is a translation table referring to symbols found in FIGS. 1 to 3.

The configuration of central station components can best be understood with reference to FIG. 3. Phone lines 100C and 100D are connected through interfaces 98C and 98D respectively to high speed receiver 138. The output of receiver 138 may be printed by high speed printer 140. Alternatively, data may be input via 900 MHz receiver 142. The data may be post-processed and displayed using computer 146 with cathode ray tube display 144. A dedicated phone line 100E connects remote command tone generator 150 via interface 98E. A 50 button auto dialer phone with adjacent 50 button cards is also connected to dedicated pone line 100E via interface 98E. The substation is dialer by the phone 148 and the tone generator 150 may be used to query the substation and to provide the kissoff tones mentioned. The tone generator may also be used to generate signals which cause corrective actions to be taken at the substation.

While certain novel features of this invention have been shown and described and are pointed out in the annexed claims, it will be understood that various omissions, substitutions and changes in the forms and the details of the device illustrated and in its operation can be made by those skilled in the art without departing from the spirit of the invention.

What is claimed is:

1. A remote unit monitoring system, comprising:
   (a) a substation which monitors fault conditions in an electrical generating facility; wherein said substation transmits the presence of said fault conditions over communications channels;
   (b) a central station which monitors said communications channels, interprets data received via said channels; and queries said substation to determine the operating status of said substation;
   (c) substation means for detecting the integrity of each of said communications channels and selecting a working channel;
   (d) substation means for providing power to said unit monitoring system when the ac mains source fails;
   (e) substation means for converting operational faults into electrical signals which said substation interprets as one of said fault conditions, said substation means including a transformer secondary circuit breaker which activates a relay whose contact closure outputs an electrical signal, and
   (f) substation means for isolating monitored subsystems from said unit monitoring system such that adjustments to said systems are not interpreted as faults.

2. A remote unit monitoring system, as recited in claim 1, wherein said substation means for converting operational faults into electrical signals which said substation interprets as one of said fault conditions comprises a feeder circuit breaker which activates a relay whose contact closure outputs an electrical signal.

3. A remote unit monitoring system, as recited in claim 1, wherein said substation means for converting operational faults into electrical signals which said substation interprets as one of said fault conditions comprises phase isolated circuit breakers each of which operates a relay wherein the contacts of said relays are wired in series such that a fault in any of said breakers produces an electrical fault signal.

4. A remote unit monitoring system, as recited in claim 1, wherein said substation means for converting operational faults into electrical signals which said substation interprets as one of said fault conditions comprises station security contacts wired in series such that the activation of any of said contacts produces an electrical fault signal.

5. A remote unit or monitoring system, as recited in claim 1, wherein said substation means for converting operational faults into electrical signals which said substation interprets as one of said fault conditions comprises liquid temperature, oil level and air supply detector contacts wired in series such that the activation of any of said contacts produces an electrical fault signal.

6. A remote unit monitoring system, as recited in claim 1, wherein said substation means for detecting the integrity of each of said communications channels and selecting a working channel comprises a telephone line fault monitor connected to each telephone line such that shorts, opens and other faults are detected; a telephone select a line which switches between said telephone lines depending upon inputs from said telephone line fault monitors; a radio transmitter which provides an alternative communications link in the event that all of said telephone lines have faults; a digital communicator which transmits all of said fault information via said communications channels; and means for remotely activating said digital communicator.

7. A remote unit monitoring system, as recited in claim 6, wherein said digital communicator executes a telephone line seizure upon initiation of a fault condition after some predetermined delay; attempts to dial a sequence of different telephone numbers waiting each time for a kissoff from said central station; wherein said digital communicator may be programmed to attempt each number some predetermined number of times; wherein the failure message is then transmitted some predetermined number of times until said central station acknowledges the reception of identical failure messages and sends a kissoff signal.

8. A remote unit monitoring system, as recited in claim 6, wherein said means for remotely activating said digital communicator comprises a remote command tone responder which seizes a ringing telephone line and responds to the presence of predetermined tones by commanding said digital communicator to begin transmitting status data.

9. A remote unit monitoring system, as recited in claim 8, wherein said digital communicator may also be tested locally by means of a normally open momentary contact digital communicator test switch.

10. A remote unit monitoring system, as recited in claim 1, wherein said substation means for isolating monitored sub-systems from said unit monitoring system such that adjustments to said systems are not interpreted as faults comprises a double pole double throw switch connected to each of said monitored channels such that one pole is used to switch power to said channel thereby preventing said channel from transmitting erroneous data; and whereby the other said pole is used to switch between two light emitting indicators such that one indicator glows when said channel is active and the other said indicator glows when said channel has been isolated.

11. A remote unit monitoring system, as recited in claim 1, wherein said central station further comprises a radio receiver which provides an alternative communication channel.

* * * * *